Patented June 7, 1949

2,472,490

UNITED STATES PATENT OFFICE 2,472,490

PROCESS OF PREPARING POROUS GLASS CATALYSTS

Charles J. Plank, Woodbury, N. J., assignor to Socony-Vacuum Oil Company, Incorporated, a corporation of New York No Drawing. Application September 13, 1947, Serial No. 773,927

5 Claims. (Cl. 252—432)

This invention is concerned with the manufacture of catalytic compositions and, more particularly, is directed to the preparation of porous siliceous catalytic compositions of matter by a process which comprises forming a boro-silicate glass containing 5 to 15 per cent by weight of a heavy metal oxide and thereafter rendering the glass porous. In its preferred embodiments, the invention contemplates preparation of catalysts suitable for the promotion of hydrocarbon conversion reactions.

The invention relates to catalysts having a predominately siliceous skeleton of porous nature produced by leaching a heat treated boro-silicate glass having a substantial amount of a heavy metal oxide as a component of the melt. Heavy metal oxides which have been found suitable as components of the glass melt include the oxides of copper, nickel and iron. It is a distinctive feature of the present invention that the porous siliceous compositions, derived from glass melts containing one or more of the aforementioned metal oxides, are themselves catalytic in nature as distinguished from inert supporting materials.

Porous glasses of the prior art, such as those described by Hood et al. in U. S. Patent 2,106,744 and U. S. Patent 2,315,329, are prepared by forming a boro-silicate glass comprising about 60 to 80 per cent $SiO_2$, about 3 to 12 per cent $Na_2O$, and about 15 to 35 per cent $B_2O_3$. It has been known that a minor proportion, up to about 4 per cent by weight, of light metal oxides such as alumina could be incorporated in the glass without materially affecting its nature, either for phase separation or the acid leaching by which a soluble phase is removed to leave a siliceous skeleton.

In accordance with the present invention, it has now been discovered that while glass melts containing amounts of alumina in excess of about 4 per cent by weight yield a material which cannot be leached to a porous glass without cracking, the presence in substantial amounts, at least 5 per cent by weight, of certain heavy metal oxides such as those of iron, copper, and nickel in the boro-silicate glass melt yields a different type of material which is capable of leaching to yield a porous glass differing from those heretofore known to the art.

The porous glasses of the prior art prepared from melts either free of metal oxides or containing minor amounts, up to 4 per cent of almunina, are homogeneous and wholly vitreous and, upon heat treating, separate into two vitreous phases. However, the use of larger amounts of the oxides of iron, copper, or nickel results in a glass of striated appearance wherein a substantial proportion of the said metal oxide is in a devitrified or crystalline state. The partially devitrified glass may be leached with suitable dilute mineral acid solutions, such as hydrochloric and sulfuric acid, after a heat treatment to induce complete phase separation of the vitreous material. The catalysts produced by the method of this invention have novel properties which are apparently related to the fact that a portion of the melt becomes crystalline when the glass cools. Without being unduly limited by any theory, it is presently believed that the novel effects noted are due, at least in part, to colloidal metals and oxides on the surface of pores resulting from leaching of partially devitrified melts.

In general, the melt, according to this invention, contains at least about 5 per cent and not more than about 15 per cent by weight of a heavy metal oxide such as those of iron, copper, or nickel. It has been established, as hereinafter pointed out, that amounts of alumina in the above identified range do not yield the porous glasses of the present invention. In contradistinction to glass melts containing 5 to 15 per cent of an oxide of iron, copper, or nickel, the inclusion of such amounts of alumina in the melt yields a material which cannot be leached to a porous glass without excessive cracking. Melts containing iron, nickel, or copper oxide, however, have been found to produce partially devitrified melts, on heat treatment, which are capable of being leached to porous glasses without cracking. It would thus appear that the glasses containing copper, iron, or nickel oxide exhibit a new phenomenon in yielding partially devitrified melts on heat treatment which, nevertheless, may still be leached to give completely satisfactory porous glass products. The glasses containing more than 4 per cent alumina, on the other hand, do not devitrify, but still do not leach without cracking to give a fine powder.

The components, other than the above identified heavy metal oxide, in the melt are alkali metal oxide ($R_2O$), $B_2O_3$, and $SiO_2$. Melts of the above are quenched and heat treated at temperatures between 400° C. and 650° C., producing what appears to be a three-phase system which is leachable with acidic solutions to form a porous glass. The acid insoluble phase is essentially silica containing small amounts of the other oxides; the devitrified phase is heavy metal oxide; and the other phase contains most of the alkali metal oxide and boric oxide. The two latter phases are largely soluble in the acid leaching solution. It is not known whether the metal oxide retained in the porous glass is derived from oxides dissolved in the silica phase or from the devitrified phase and deposited from the leaching solution. The former theory appears to be better supported by the facts, since continued leaching does not completely remove the oxide.

The manner of cooling the melt in preparing catalysts presents some problems not encountered when the porous glass is to be heated to close the pores and give finished articles of desired form. Catalyst particles of the order of 16 mesh and larger are eminently suited for most catalytic processes. If the glass is formed into a desired shape before leaching, annealing to reduce strains is desirable. However, annealing is expensive and time consuming. For most purposes, it is preferred to use sized particles produced by crushing of the porous glass. It has been found that quenching the melt causes shattering of the mass, which aids in preparing for the crushing step. However, air quenching yields an excessive amount of particles too small for use, whereas liquid quenching produces only about half as much fines as air quenching. In a typical example, two identical melts were handled in the same manner except that one was quenched by pouring onto a stone slab and the other by pouring into water. The activity for catalytic cracking of hydrocarbons of the two catalysts formed by soaking the porous glasses in aluminum nitrate solution and igniting was identical but air quenching produced 34 per cent and water quenching 18 per cent of particles finer than 16 mesh. It may be noted that the apparent density (weight in grams per cc. of a mass of dry particles) varied. The air-quenched catalyst had an apparent density of 0.88 gram per cc. while that of the water-quenched catalyst was 0.95 gram per cc.

It is pointed out in the prior art that the phase separation which occurs in heat treating alkali oxide-$B_2O_3$-$SiO_2$ glasses of a certain range is distinct and very different from devitrification (or crystallization) and that, after heat treatment, these compositions have separated into two glassy phases. It has been discovered, however, that melts containing 5–15 per cent heavy metal oxide, $R_2O$ 5–15 per cent, $B_2O_3$ 15–30 per cent and $SiO_2$ 55–75 per cent, although they devitrify, may be leached with dilute acids to give porous glasses. The devitrified phase is an acid-soluble phase. The leachability of this partially devitrified mass is increased in some cases by heat treating this two-phase system until separation of the heavy metal oxide, $R_2O$ and $B_2O_3$ becomes more nearly complete, probably with the separation of a third phase which is also soluble. The temperature of this heat treatment is between 400 and 650° C., for times varying from several days at the lower temperatures to a few minutes at the higher. In some cases where the solubility of the heavy metal oxide is fairly high, the devitrification may not take place on cooling the melt. However, on reheating the melt to temperatures between 400° C. and 650° C., the devitrification occurs and the devitrified phase is soluble in dilute acids.

The devitrified melts are in all cases striated, having zones of different color and, in general, they are opaque. The mass is, however, leachable throughout, the resultant porous glass showing no visible variation due to the original striated appearance of the parent material.

It has also been found that leaching of the glasses disclosed herein may be accomplished in concentrated, preferably saturated, solutions of ammonium chloride which contain no acid radicals other than those furnished by the salt.

The following illustrative and comparative examples will serve to illustrate the process of the present invention.

Example I

A batch was made up comprising $Al_2O_3$ 4 per cent, $Na_2O$ 8.2 per cent, $B_2O_3$ 27.8 per cent and $SiO_2$ 60.0 per cent. The powders were ball milled several hours to obtain homogeneity and then were heated 30 minutes at a temperature of 350° F. to remove moisture, and thereafter were placed in a furnace at a temperature of 2400° F. After about 3 hours, the temperature had reached 2700° F. and the melts were then poured. The quenched glass was then heat treated 48 hours at a temperature of 1050° F. At this stage of the operation the glass was brown in color but still transparent and completely glassy in appearance. After the heat treating step, the melt was crushed to about 2 to 10-mesh pieces and etched for about 15 minutes in hot potassium hydroxide solution to facilitate leaching, which was thereafter carried out with a 1 normal solution of hydrochloric acid saturated with ammonium chloride. The above glass melt containing 4 per cent by weight of alumina leached to a porous glass with substantially no cracking.

Example II

A batch was made up comprising $Al_2O_3$ 5.0 per cent, $Na_2O$ 6.9 per cent, $B_2O_3$ 28.1 per cent, and $SiO_2$ 60.0 per cent. This mixture was treated exactly as in the process of Example I. However, when the resultant melt was subjected to leaching, excessive cracking of the glass pieces occurred to such an extent that the resultant particles were friable and produced a fine powder.

From the above two examples, it will be seen that whereas a boro-silicate glass melt containing 4 per cent alumina can be readily leached to yield a porous glass, a similar melt containing 5 per cent alumina yields a material which cannot be leached to a porous glass without cracking. Boro-silicate glass melts with oxides of iron, nickel, or copper produce partially devitrified melts on heat treatment which are capable of being leached to porous glasses without cracking, as shown by the following examples:

Example III

A batch was made up comprising NiO 10.5 per cent, $Na_2O$ 7.1 per cent, $B_2O_3$ 20.4 per cent and $SiO_2$ 62.0 per cent. This was melted and brought to a temperature of 2500° F. and then poured into cold water. The product was black and opaque. This devitrified product could be leached to a nearly colorless glass, but cracked very greatly in the process. However, after reheating the batch to 1000° F. for 16 hours, the leaching produced a practically colorless porous glass having submicroscopic pores, with substantially no cracking. This porous glass was soaked in 15 per cent Al(NO₃)₃·9H₂O for 16 hours and tested as a cracking catalyst. The cracking test was made by contacting vapors of Oklahoma City gas oil with the catalyst at 800° F., atmospheric pressure and a space velocity of one volume liquid oil per volume of catalyst per hour. A single pass yield of 23 per cent 410° F. gasoline from gas oil was produced.

*Example IV*

A batch containing 5.1 per cent CuO, 8.5 per cent Na₂O, 25.4 per cent B₂O₃ and 61.0 per cent SiO₂ was melted, the temperature brought to 2500° F. and the melt poured into cold water. The glass produced was opaque and practically black, and while 1 normal HCl leached the glass, excessive cracking occurred. After heat treating the batch for 16 hours at 1000° F. an opaque glass with dark green and yellow green striations was produced. This partially devitrified glass leached with no cracking to give a porous glass containing submicroscopic pores.

*Example V*

A batch containing 5.0 per cent Fe₂O₃, 8.6 per cent Na₂O, 24.7 per cent B₂O₃ and 61.7 per cent SiO₂ was melted and brought to 2550° F., then poured into water. A black glass was produced. This also leached in 1 normal HCl at 75° C., but cracked excessively. After heat treatment at 1000° F. for 16 hours, the glass had changed to a deep reddish brown color with purplish reflections from edges and a striated appearance. This glass leached very readily in 1 normal HCl to give a porous glass having a bluish opalescence and possessing submicroscopic pores.

*Example VI*

A batch containing 10.6 per cent NiO, 8.0 per cent Na₂O, 23.9 per cent B₂O₃ and 57.5 per cent SiO₂ was melted and the temperature raised to 2600° F. The glass was poured at that temperature, cooling the glass in air. The product here was a black glass with yellow striations. This glass was heated in the muffle for 20 hours at 1050° F. and then 20 hours at 1350° F. It was then leached by 1 normal HCl saturated with NH₄Cl to a porous glass which was white and opaque. However, a saturated NH₄Cl solution alone leached samples of the same glass to produce a porous glass which still showed a green color, indicating the presence of larger amounts of NiO in the porous glass.

The above Examples III to VI indicate that boro-silicate glass melts containing substantial proportions of the oxides of iron, copper, or nickel are capable of being leached to yield porous siliceous compositions of matter suitable for use as a catalyst. It is intended, however, that the invention shall not be limited to those cases in which the siliceous skeleton functions as an essential part of a composite catalyst since the principles of this invention may likewise be used in preparing catalyst supports. For example, a metal oxide or reduced metal obtained from the original melt may function as an activator or promoter for the catalyst deposited on the porous glass, and a moderating effect of such oxides and metals may be used to diminish the activity of overly active catalysts.

This application is a continuation-in-part of co-pending application Serial Number 565,189, filed November 25, 1944, now abandoned.

I claim:

1. A process for preparing a porous siliceous composition of matter suitable for use as a catalyst and promoting catalyst carrier, which comprises forming a glass melt consisting essentially of 5 to 15 per cent of an alkali metal oxide, 15 to 30 per cent of boric oxide, 55 to 75 per cent of silica, and 5 to 15 per cent of a metal oxide selected from the group consisting of the oxides of iron, copper, and nickel, heating said melt at a temperature of between about 400° C. and about 650° C. to effect a solid glass having a phase rich in silica, a phase poor in silica, and a devitrified phase, leaching said glass with an acidic aqueous solution selected from the group consisting of dilute aqueous solutions of mineral acids and concentrated aqueous solutions of ammonium chloride to dissolve out said phase poor in silica and said devitrified phase and thereafter drying the resultant porous composition.

2. A process for preparing a porous siliceous composition of matter suitable for use as a catalyst and promoting catalyst carrier, which comprises forming a glass melt consisting essentially of 5 to 15 per cent of an alkali metal oxide, 15 to 30 per cent of boric oxide, 55 to 75 per cent of silica, and 5 to 15 per cent of an oxide of iron, heating said melt at a temperature of between about 400° C. and about 650° C. to effect a solid glass having a phase rich in silica, a phase poor in silica, and a devitrified phase, leaching said glass with an acidic aqueous solution selected from the group consisting of dilute aqueous solutions of mineral acids and concentrated aqueous solutions of ammonium chloride to dissolve out said phase poor in silica and said devitrified phase and thereafter drying the resultant porous composition.

3. A process for preparing a porous siliceous composition of matter suitable for use as a catalyst and promoting catalyst carrier, which comprises forming a glass melt consisting essentially of 5 to 15 per cent of an alkali metal oxide, 15 to 30 per cent of boric oxide, 55 to 75 per cent of silica, and 5 to 15 per cent of an oxide of copper, heating said melt at a temperature of between about 400° C. and about 650° C. to effect a solid glass having a phase rich in silica, a phase poor in silica, and a devitrified phase, leaching said glass with an acidic aqueous solution selected from the group consisting of dilute aqueous solutions of mineral acids and concentrated aqueous solutions of ammonium chloride to dissolve out said phase poor in silica and said devitrified phase and thereafter drying the resultant porous composition.

4. A process for preparing a porous siliceous composition of matter suitable for use as a catalyst and promoting catalyst carrier, which comprises forming a glass melt consisting essentially of 5 to 15 per cent of an alkali metal oxide, 15 to 30 per cent of boric oxide, 55 to 75 per cent of silica, and 5 to 15 per cent of an oxide of nickel, heating said melt at a temperature of between about 400° C. and about 650° C. to effect a solid glass having a phase rich in silica, a phase poor in silica, and a devitrified phase, leaching said glass with an acidic aqueous solution selected from the group consisting of dilute aqueous solutions of mineral acids and concentrated aqueous solutions of ammonium chloride to dissolve out said phase poor in silica and said devitrified phase and thereafter drying the resultant porous composition.

5. A process for repairing a porous siliceous composition of matter suitable for use as a catalyst and promoting catalyst carrier, which comprises forming a glass melt consisting essentially of 5 to 15 per cent of an alkali metal oxide, 15 to 30 per cent of boric oxide, 55 to 75 per cent of silica, and 5 to 15 per cent of a metal oxide selected from the group consisting of the oxides of iron, copper, and nickel, water-quenching said melt, heating said melt at a temperature of between about 400° C. and about 650° C. to effect a solid glass having a phase rich in silica, a phase poor in silica, and a devitrified phase, leaching said glass with an acidic aqueous solution selected from the group consisting of dilute aqueous solutions of mineral acids and concentrated aqueous solutions of ammonium chloride to dissolve out said phase poor in silica and said devitrified phase and thereafter drying the resultant porous composition.

CHARLES J. PLANK.

REFERENCES CITED

The following references are of record in the file of this patent:

UNITED STATES PATENTS

| Number | Name | Date |
|---|---|---|
| 1,623,301 | Brenner | Apr. 5, 1927 |
| 2,137,931 | Craven et al. | Nov. 22, 1938 |
| 2,315,329 | Hood et al. | Mar. 30, 1943 |
| 2,382,056 | Hood | Aug. 14, 1945 |
| 2,430,432 | Marisic | Nov. 4, 1947 |